United States Patent
Allen et al.

(10) Patent No.: US 9,706,045 B2
(45) Date of Patent: *Jul. 11, 2017

(54) SYSTEM AND METHOD FOR INTEGRATING AN OUTGOING CELLULAR CALL AS AN ENTERPRISE CALL IN AN IMS ENVIRONMENT

(75) Inventors: Andrew Allen, Mundelein, IL (US); Adrian Buckley, Tracy, CA (US); Richard George, Waterloo (CA); Brian Oliver, Fergus (CA); Lap Luu, Markham (CA); Dalsu Lee, Thornhill (CA)

(73) Assignee: BlackBerry Limited, Waterloo, Ontario (CA)

(*) Notice: Subject to any disclaimer, the term of this patent is extended or adjusted under 35 U.S.C. 154(b) by 698 days.

This patent is subject to a terminal disclaimer.

(21) Appl. No.: 11/796,827

(22) Filed: Apr. 30, 2007

(65) Prior Publication Data

US 2008/0268824 A1    Oct. 30, 2008

(51) Int. Cl.
*H04M 3/42* (2006.01)
*H04M 7/12* (2006.01)

(52) U.S. Cl.
CPC ..... *H04M 3/42059* (2013.01); *H04M 3/4234* (2013.01); *H04M 7/123* (2013.01); *H04M 2207/18* (2013.01)

(58) Field of Classification Search
CPC ........... H04M 3/42059; H04M 3/4234; H04M 7/123; H04M 2207/18
USPC ........... 455/428, 415, 417, 414.1; 379/88.21, 379/219
See application file for complete search history.

(56) References Cited

U.S. PATENT DOCUMENTS

| | | |
|---|---|---|
| 7,113,500 B1 | 9/2006 | Bollinger et al. |
| 7,260,385 B2 | 8/2007 | Heinmiller et al. |
| 7,496,360 B2 | 2/2009 | Sindhwani et al. |
| 7,515,905 B2 | 4/2009 | Begeja et al. |

(Continued)

FOREIGN PATENT DOCUMENTS

| | | |
|---|---|---|
| EP | 0582440 | 7/1993 |
| EP | 1531635 A1 | 5/2005 |

(Continued)

OTHER PUBLICATIONS

European Search Report; European Patent Office; Nov. 7, 2007; 8 pages.

(Continued)

*Primary Examiner* — Wayne Cai
(74) *Attorney, Agent, or Firm* — Fish & Richardson P.C.

(57) ABSTRACT

In one embodiment, an IMS network node is operable, responsive to receiving a SIP INVITE request from an enterprise user to initiate origination of an outgoing cellular call to a called party, for establishing a first call leg to the enterprise user by sending a SIP INVITE message back to the enterprise user. The IMS network node includes functionality for establishing a second call leg to the called party. The first and second call legs are patched to establish an end-to-end communications path between the enterprise user and the called party, wherein an enterprise address instead of a non-enterprise address of the enterprise user is presented to the called party as a calling line identity with respect to the outgoing cellular call from the enterprise user.

22 Claims, 8 Drawing Sheets

(56) References Cited

U.S. PATENT DOCUMENTS

| | | | |
|---|---|---|---|
| 7,539,492 | B2 | 5/2009 | Jagadeesan et al. |
| 7,627,101 | B2 | 12/2009 | Chang et al. |
| 7,672,440 | B2 | 3/2010 | Chen et al. |
| 7,817,012 | B2 | 10/2010 | Ehlinger et al. |
| 7,903,635 | B2 | 3/2011 | Silver et al. |
| 7,920,548 | B2 | 4/2011 | Lor et al. |
| 7,961,714 | B1* | 6/2011 | Watson et al. ............... 370/352 |
| 7,965,997 | B2 | 6/2011 | Sposato et al. |
| 8,000,710 | B2 | 8/2011 | Jagadeesan et al. |
| 8,000,712 | B2 | 8/2011 | Gisby et al. |
| 8,060,071 | B2 | 11/2011 | Bertagnole et al. |
| 8,078,151 | B2 | 12/2011 | Martin et al. |
| 8,107,464 | B2 | 1/2012 | Schmidt et al. |
| 8,194,640 | B2 | 6/2012 | Ramachandran et al. |
| 2002/0019246 | A1 | 2/2002 | Forte |
| 2002/0089998 | A1 | 7/2002 | Le |
| 2003/0002476 | A1 | 1/2003 | Chung |
| 2004/0196867 | A1 | 10/2004 | Ejzak et al. |
| 2005/0058125 | A1 | 3/2005 | Mutikainen et al. |
| 2005/0078642 | A1 | 4/2005 | Mayer et al. |
| 2006/0030357 | A1 | 2/2006 | McConnell |
| 2006/0034336 | A1 | 2/2006 | Huh et al. |
| 2006/0080407 | A1 | 4/2006 | Rengaraju |
| 2006/0121924 | A1 | 6/2006 | Rengaraju et al. |
| 2006/0294245 | A1 | 12/2006 | Raguparan et al. |
| 2007/0015535 | A1* | 1/2007 | LaBauve et al. ........... 455/552.1 |
| 2007/0091830 | A1 | 4/2007 | Coulas et al. |
| 2007/0146475 | A1 | 6/2007 | Inoue |
| 2007/0204065 | A1 | 8/2007 | Harton et al. |
| 2007/0293220 | A1* | 12/2007 | Mahler et al. ............. 455/435.1 |
| 2008/0119165 | A1* | 5/2008 | Mittal ............... H04L 29/06027 455/411 |
| 2008/0125123 | A1* | 5/2008 | Dorenbosch et al. ........ 455/436 |
| 2008/0144637 | A1* | 6/2008 | Sylvain et al. ............... 370/401 |
| 2008/0267170 | A1 | 10/2008 | Allen |
| 2008/0268824 | A1 | 10/2008 | Allen |
| 2008/0268825 | A1 | 10/2008 | Allen |
| 2009/0312026 | A1 | 12/2009 | Parameswar |
| 2013/0196637 | A1 | 8/2013 | Allen et al. |

FOREIGN PATENT DOCUMENTS

| | | |
|---|---|---|
| EP | 1675413 | 6/2006 |
| GB | 2342536 A | 4/2000 |
| WO | 2004077796 A2 | 9/2004 |

OTHER PUBLICATIONS

Dutta, A. et al.; "Flexible Call Control Framework Supporting Multi-party Service"; Columbia University; 7 pages.
European Search Report; European Patent Office; Nov. 2, 2007; 9 pages.
Devriendt, J. et al.; "Network Migration Strategies towards IMS"; Strategy White Paper; Alcatel; 9 pages.
European Communication Examination Report, Application No. 07107246.6, European Patent Office, Jul. 27, 2010, 4 pgs.
Canadian Office Action, Application No. 2,630,097, Canadian Intellectual Property Office, Sep. 13, 2010, 2 pgs.
Chinese Office Action, Application No. 2008-10210302.6, Chinese IPO, Aug. 12, 2010, 5 pgs.
European Communication Examination Report, Application No. 07 107 244.1, European Patent Office, Apr. 8, 2010, 4 pgs.
"Interworking zwischen dem IMS Messagingservice und SMS oder MMS" IP.com Journal, IP.com Inc., West Henrietta, NY, US, Oct. 10, 2006, XP011311601 8ISSN: 1533-001, (English Translation), 3 pgs.
European Communication Examination Report, Application No. 07 107 248.2, European Patent Office, Feb. 2, 2010, 4 pgs.
IP India, Examination Report, Application No. 1063/CHE/2008, Jul. 11, 2013, 2 pgs.
IP India, Examination Report, Application No. 1081/CHE/2008, Oct. 3, 2013, 1 pg.
USPTO, Notice of Publication, U.S. Appl. No. 13/562,572, Aug. 1, 2013, 1 pg.
CIPO, Notice of Allowance, Application No. 2630097, Sep. 5, 2012, 1 pg.
USPTO, Office Action, U.S. Appl. No. 11/796,804, Oct. 12, 2012, 23 pgs.
SIPO, Office Action, Application No. 200810188715, Aug. 3, 2011, 8 pgs.
USPTO, Office Action, U.S. Appl. No. 11/796,804, Oct. 26, 2011, 13 pgs.
CIPO, Office Action, Application No. 2630101, Jul. 12, 2012, 4 pgs.
CIPO, Office Action, Application No. 2630130, Jul. 12, 2012, 3 pgs.
EPO, Communication Pursuant to Article 94(3) EPC, Application No. 07107244.1, Aug. 7, 2012, 4 pgs.
EPO, Communication Pursuant to Article 94(3) EPC, Application No. 07107248.2, Aug. 7, 2012, 5 pgs.
SIPO, Office Action, Application No. 200810188751.5, Jul. 9, 2012, 2 pgs.
SIPO, Office Action, Application No. 200810210303.0, Jul. 11, 2012, 4 pgs.
EPO, Search Report, Application No. 07107246.6, Oct. 15, 2007, 7 pgs.
SIPO, Office action, Application No. 200810210303.0, Apr. 22, 2011, 2 pgs.
USPTO, Office Action, U.S. Appl. No. 11/796,804, Mar. 17, 2011, 15 pgs.
USPTO, Office Action, U.S. Appl. No. 11/796,915, Oct. 4, 2010, 15 pgs.
ZTE Technologies, IMS Special issue, vol. 9, No. 3, Issue 86, Mar. 2007, 32 pgs.
IP India, First Examination Report, Application No. 1061/CHE/2008, Nov. 23, 2012, 2 pgs.
SIPO, Notification of Grant of Rights for Invention Patent, Application No. 200810210303.0, Dec. 24, 2012, 2 pgs.
USPTO, Notice of Allowance and Fee(s) Due, U.S. Appl. No. 13/562,572, Nov. 6, 2013, 9 pgs.
IP India, Hearing Notice, Application No. 1060/CHE/2008, Dec. 18, 2013, 1 pg.
SIPO, Office Action, Application No. 200810210302.6, Jan. 31, 2012, 7 pgs.
USPTO, Office Action, U.S. Appl. No. 11/796,804, Mar. 7, 2012, 11 pgs.
CIPO, Notice of Allowance, Application No. 2630101, Feb. 11, 2013, 1 pg.
USPTO, Response to Rule 312 Communication, U.S. Appl. No. 13/562,572, Feb. 21, 2014, 2 pgs.
CA Office Action, Application No. 2,630,130, Canadian IPO, Feb. 25, 2011, 4 pgs.
CA Office Action, Application No. 2,630,101, Canadian IPO, Feb. 28, 2011, 5 pgs.
US Office Action, U.S. Appl. No. 11/796,915, USPTO, Feb. 28, 2011, 15 pgs.
CIPO, Office Action, Application No. 2,630,130, Apr. 23, 2013, 3 pgs.
SIPO, Office Action, Application No. 200810210303.0, Mar. 19, 2012, 7 pgs.
USPTO, Notice of Allowance, U.S. Appl. No. 11/796,915, May 3, 2012, 23 pgs.
IP India, Office Action, Application No. 1063/CHE/2008, Nov. 7, 2012, 2 pgs.
SIPO, Office Action, Application No. 200810210302.6, Sep. 29, 2012, 9 pgs.
CIPO, Office Action, Application No. 2,630,130, Jun. 13, 2014, 2 pgs.
Communication Pursuant to Article 94(3) EPC issued in European Application No. 07107246.6 on Feb. 2, 2016.

* cited by examiner

SYSTEM AND METHOD FOR INTEGRATING AN OUTGOING CELLULAR CALL AS AN ENTERPRISE CALL IN AN IMS ENVIRONMENT

CROSS-REFERENCE TO RELATED APPLICATION(S)

This application discloses subject matter that is related to the subject matter of the following U.S. patent application(s): (i) "SYSTEM AND METHOD FOR PRESENTING MEDIA TO MULTIPLE PARTIES IN A SIP ENVIRONMENT" application Ser. No. 11/796,804, filed even date herewith, in the name(s) of Andrew Allen, Adrian Buckley, Richard George, Brian Oliver, Lap Luu and Dalsu Lee; and (ii) "SYSTEM AND METHOD FOR INTEGRATING AN OUTGOING CELLULAR CALL AS AN ENTERPRISE CALL", application Ser. No. 11/796,915, filed even date herewith, in the name(s) of Andrew Allen, Adrian Buckley, Richard George, Brian Oliver, Lap Luu and Dalsu Lee, which is (are) hereby incorporated by reference.

FIELD OF THE DISCLOSURE

The present patent disclosure generally relates to communications networks. More particularly, and not by way of any limitation, the present patent disclosure is directed to a system and method for integrating an outgoing cellular call as an enterprise call in an IP Multimedia Subsystem (IMS) network environment.

BACKGROUND

Many enterprise networks are replacing their existing Private Branch Exchange (PBX)- and Central Office Exchange (CENTREX)-based telephony systems with systems based upon Voice-over-IP (VoIP) and Session Initiation Protocol (SIP)-based signaling systems that utilize the existing enterprise IP infrastructure, e.g., Local Area Network (LAN) and Wireless LAN (WLAN) technologies. It is not uncommon for enterprise employees to regularly use mobile communications devices when away from the enterprise, which interoperate with cellular networks such as, e.g., the Global System for Mobile Communications (GSM) networks, Code Division Multiple Access (CDMA) networks, and Universal Mobile Telecommunications System (UMTS) networks, to keep in touch with other employees of the enterprise and to conduct business communications with other people outside the enterprise. Additionally, mobile communications devices are being enhanced to provide SIP-based communications (including VoIP) over WLAN access as well as cellular networks, thereby allowing these devices to provide mobile telephony communications capability when within the enterprise as well as when away from the enterprise. It is expected that such developments may allow replacement of the ubiquitous wired desktop phone in the enterprise with dual-mode, WLAN-capable mobile devices.

Although cellular telephony networks have deployed IP-based data communications capabilities through exploitation of well-known technologies, it is generally understood that these networks cannot currently commercially support carrier-class VoIP telephony services due to issues of delay, Quality of Service (QoS) and efficiency, which prevent cost-effective usage of such networks for purposes of providing acceptable quality voice services. Accordingly, for the foreseeable future, telephony services based upon the existing network infrastructure are likely to continue to utilize conventional circuit-switched network technology for telephony calls.

Based on the foregoing, it should appreciated that the integration of VoIP enterprise networks with carrier cellular telephony networks in order to serve an enterprise user within the enterprise as well as while away is fraught with numerous difficulties. Moreover, in such scenarios it may be desirable for enterprises to have certain control over the calls made by their employees for tracking and monitoring purposes. In addition, it would be desirable to provide value-added enterprise call integration services within the context of ongoing development of current $3^{rd}$ Generation Partnership Project (3GPP) standards which specify an Internet Protocol (IP)-based core network architecture referred to as the IP Multimedia Subsystem (IMS).

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a scheme for integrating an outgoing cellular call as an enterprise call within an IMS environment wherein an enterprise user's enterprise address is presented to the called party instead of the enterprise user's non-enterprise address (e.g., cellular telephony number). In one aspect, disclosed herein is an embodiment of a method for integrating an outgoing cellular call as an enterprise call in an IMS environment, wherein the outgoing cellular call is originated by an enterprise user towards a called party, the enterprise user having an enterprise address and a non-enterprise address. The claimed embodiment comprises: receiving a SIP INVITE request from the enterprise user for initiating the outgoing cellular call to the called party; establishing a first call leg to the enterprise user, e.g., by providing a SIP INVUTE message back to the enterprise user; establishing a second call leg to the called party; and patching the first and second call legs to establish an end-to-end communications path between the enterprise user and the called party, wherein the enterprise address is presented instead of the non-enterprise address to the called party as a calling line identity with respect to the outgoing cellular call from the enterprise user.

In another aspect, disclosed herein is an embodiment of an IMS network node for integrating an outgoing cellular call as an enterprise call, wherein the outgoing cellular call is originated by an enterprise user towards a called party, the enterprise user having an enterprise address and a non-enterprise address. The claimed embodiment comprises: means for receiving a SIP INVITE request from the enterprise user for initiating the outgoing cellular call to the called party; means for establishing a first call leg to the enterprise user; means for establishing a second call leg to the called party; and means for patching the first and second call legs to establish an end-to-end communications path between the enterprise user and the called party, wherein the enterprise address is presented instead of the non-enterprise address to the called party as a calling line identity with respect to the outgoing cellular call from the enterprise user.

In a further aspect, disclosed herein is an embodiment of an IMS-capable user equipment (UE) device operable to generate an outgoing cellular call as an enterprise call to a called party. The claimed embodiment comprises: means for generating a SIP INVITE request with respect to initiating an outgoing cellular call to a called party, the SIP INVITE request being directed to an IMS network node; and means for establishing a call leg with the IMS network node responsive to receiving a SIP INVITE message back from the IMS network node.

Figure 1:
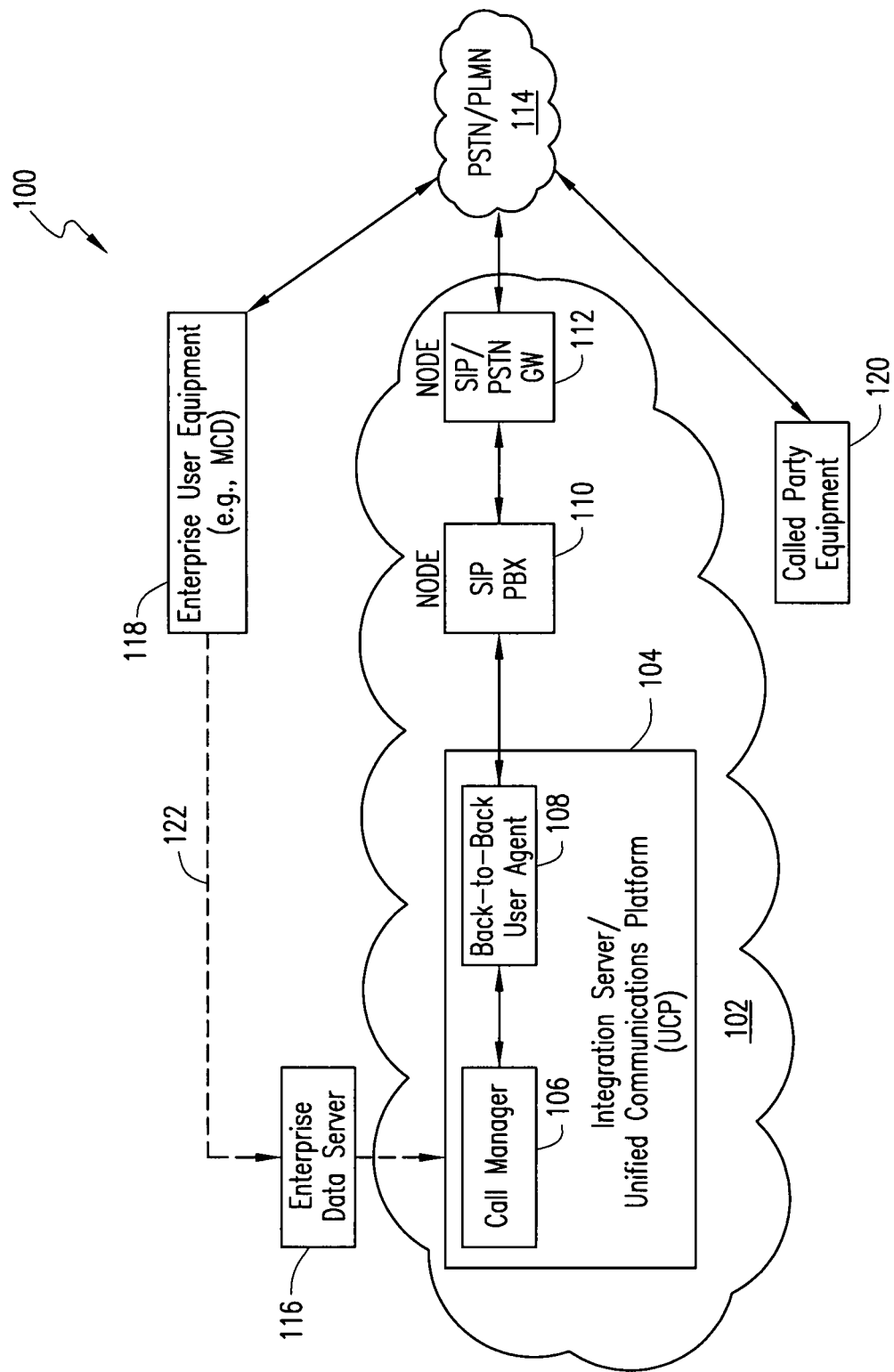
FIG. 1 depicts an exemplary network environment wherein one or more embodiments of the present patent disclosure may be practiced for purposes of integrating an outgoing cellular call as an enterprise call.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein one or more embodiments of the present patent disclosure may be practiced for integrating an outgoing cellular call as an enterprise call. As depicted, the network environment 100 includes a generalized network infrastructure 102 wherein certain portions may form an enterprise network whereas the remaining portions may comprise an external network arrangement such as one or several service provider networks that serve as intermediary networks with respect to the enterprise network and the well-known PSTN/PLMN infrastructure 114. For purposes herein, an enterprise network may be any communications network internal to a company, office, or organization, and may comprise wireline and/or wireless network infrastructure. Regardless of the actual implementation, the network infrastructure 102 includes an integration server (also referred to as a Unified Communications Platform (UCP) element) 104, a switching element such as a SIP-capable Private Branch Exchange (PBX) 110 and a gateway (GW) element such as a SIP/PSTN GW 112. As alluded to previously, one or more of these elements may be incorporated within an enterprise network infrastructure in one embodiment. Alternatively, one or more of these elements or their functionalities may be hosted in a service provider network. In either arrangement, the functionalities of the elements may be integrated or redistributed into separate network entities. Accordingly, for purposes of the present patent disclosure, a "network node" may comprise a generalized network entity that effectuates or facilitates at least a portion of the functionalities set forth hereinbelow with respect to call integration.

An enterprise user is operable to effectuate communications (e.g., voice/data/video calls or multimedia sessions, and the like) in a number of scenarios within the context of the network environment 100 with respect to a called party 120. In general, the enterprise user is capable of initiating communications using one of two addresses: an enterprise address that may be used for calls made from within the enterprise network and a non-enterprise address for calls made from outside the enterprise network. In one application, the enterprise user may be provided with two separate pieces of user equipment (UE) 118: a wireline telephony equipment having the enterprise address that is used when the enterprise user is on the enterprise premises and a mobile communications device (MCD) having a cellular telephony number (i.e., non-enterprise address) that may be used when the enterprise user is away. Alternatively, where local wireless connectivity to the enterprise network is supported, a single wireless UE device operable in two different radio access technologies (RATs) may be provided. In this scenario, when the wireless UE device is attached to the enterprise network via any known or heretofore unknown Wireless Local Area Network (WLAN) technology, calls originated by the enterprise user may have the enterprise address as the calling party number. On the other hand, calls originated when the wireless UE device is attached to a wide area cellular network (WACN) such as the Public Land Mobile Network (PLMN) 114 may have the non-enterprise address (e.g., cellular telephony number) as the calling party number. Accordingly, it should be appreciated that the enterprise user equipment 118 may be a conventional cellular phone having data channel capability (e.g., Short Message Service or SMS capability) or a dual-mode MCD having WLAN capability (for enterprise operation) and WACN capability (for remote operation). Additionally, for purposes of further generalization, the enterprise UE device 118 may also comprise any personal computer (e.g., desktops, laptops, palmtops, personal digital assistants (PDAs) or other handheld computing devices) equipped with a suitable wireless modem, as well as a communications device operable in both circuit-switched (CS) and packet-switched (PS) communications that may even be capable of effectuating an inter-technology handoff between both CS and PS domains.

Based on the foregoing, it may be realized that the enterprise and non-enterprise addresses for an enterprise user may take on different forms, depending on the equipment and service provisioning. For instance, the enterprise address may comprise a SIP Uniform Resource Identifier (URI) or an E-164 number. Likewise, the non-enterprise address and the called party address may also comprise either SIP URIs, E.164 numbers, or other identifiers.

An enterprise data server 116 may be disposed in association with at least a portion of the network 102, preferably with the UCP node 104 when provisioned as part of an enterprise network. A data communications path 122 may be effectuated between the enterprise UE 118 and the enterprise network over the PLMN data network infrastructure via the enterprise data server 116. Regardless of whether integrated within an enterprise network or disposed in a service provider network, UCP node 104 preferably includes a Call Manager functionality 106 as well as a SIP Back-to-Back User Agent (B2BUA) 108 that is operable to perform third-party call control in order to combine multiple call legs together. In general, all enterprise SIP calls may be routed via the UCP node 104 and it is the role of the UCP node 104 to trigger the routing of the incoming SIP calls to the enterprise user regardless of whether UE 118 is attached via the enterprise WLAN or via the PLMN cellular network. Further, as will be described in detail below, the enterprise data server 116 can also receive a trigger message (i.e., a request to originate an outgoing cellular call) from UE 118 that is attached to the PLMN cellular network 114 via the cellular network's data network (such as GPRS or CDMA packet data network, for example) to request that the UCP node 104 establish a call between the enterprise UE 118 and the equipment 120 of the called party.

Figure 2:
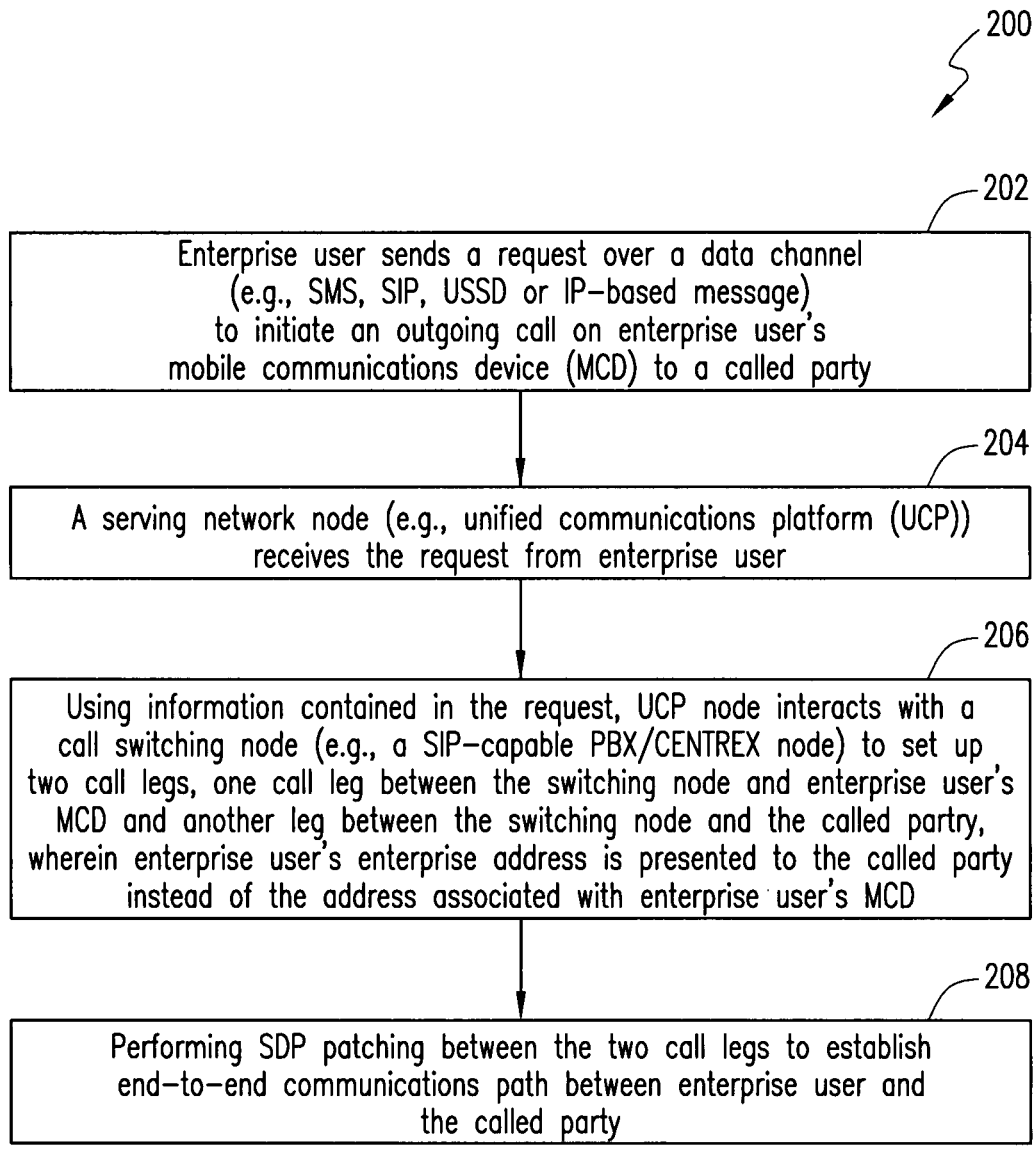
FIG. 2 depicts a flowchart of the present patent disclosure according to one embodiment.

Taking reference to FIGS. 1 and 2 together, a generalized scheme 200 for integrating outgoing calls from the enterprise UE 118 when it is attached to the cellular network may be set forth as follows. The enterprise user using its equipment sends a request message to a serving network node (i.e., the UCP element 104 shown in FIG. 1) via the cellular network's data network (block 202). Additionally or alternatively, the request message may also be mediated via an enterprise data server. In one embodiment, the request may comprise a SIP Request such as a SIP REFER message or some other SIP Request (e.g., a SIP INVITE message) either sent directly to the enterprise data server 116 via the cellular network's data network or routed to the UCP node 104 via the cellular network's SIP based infrastructure such as the IP Multimedia Subsystem (IMS). Alternatively, the message may not be a SIP Message at all and could be any message that contains the necessary information to enable the UCP node 104 to establish a call between the enterprise UE 118 and the called party's equipment 120 that the enterprise user is attempting to call (e.g., an SMS message, an Unstructured Supplementary Service Data (USSD) message, or an IP based message). In accordance with an embodiment, the following pieces of information may be transmitted as part of the request message: (i) the enterprise address (e.g., SIP URI or E.164 number) that the enterprise user is reachable at; (ii) the non-enterprise address (e.g., E.164 number) that the enterprise UE is reachable at when it is attached to the cellular network; (iii) the E.164 number or SIP URI of the called party; and (iv) an indication of whether privacy is required. Upon receiving the request message from the enterprise UE (block 204), the service logic at the UCP node 104 uses the received information to effectuate two call legs in association with a switching node such as a SIP-capable PBX/CENTREX node, a first call leg between the switching node and the enterprise UE and a second call leg between the called party's UE and the switching node wherein the enterprise user's enterprise address is presented to the called party instead of the non-enterprise address associated with the UE (i.e., the cellular number) (block 206). Thereafter, the first and second call legs are patched together wherein the two respective Session Description Protocol (SDP) streams associated with the call legs are joined in order to establish an end-to-end bearer communications path between the enterprise user and the called party (block 208).

Set forth below is an example of how a SIP REFER request can be used to trigger the UCP node 104 to establish an outgoing call within the context of the scheme described above:

TABLE I

REFER sip: IntegrationServer@companyXXX.com; SIP/2.0
Via: SIP/2.0/UDP PIN12345678.blackberry.com
  ;branch=z9hG4bKhjhs8ass83
Max-Forwards: 70
To: <sip: IntegrationServer@companyXXX.com>

TABLE I-continued

From: Mike <sip:Mike@companyXXX.com>;tag=32331
Call-ID: d432fa84b4c76e66710
Cseq: 2 REFER
Contact: <sip:PIN12345678.blackberry.com>
Refer-To: <cid:cn35t8jf02@companyXXX.com>
Require: multiple-refer
Content-Type: application/resource-lists+xml
Content-Disposition: recipient-list
Content-Length: 362
Content-ID: <cn35t8jf02@example.com>
<?xml version="1.0" encoding="UTF-8"?>
<resource-lists xmlns+"urn:ietf:params:xml:ns:resource-lists"
    Xmins:xsi="http://www.w3.org/2001/XML.Schema-instance">
  <list>
  <entry uri="tel: 098-765-4321"/>
  <entry uri="tel: 123-456-7890"/>
  </list>
  </resource-lists>

Those skilled in the art will recognize that the above SIP REFER request embodiment uses the Resource List mechanism defined in draft-ietf-sip-multiple-refer and draft-ietf-simple-xcap-list-user to trigger the sending of a SIP INVITE request towards both the enterprise UE 118 and the called party equipment 120 using the list entry uri elements to deliver both the E.164 number that the enterprise UE is reachable at via the cellular network and the E.164 number of the party being called. Accordingly, when the UCP node 104 receives the SIP REFER request or other trigger message, it uses SIP Third Party Call Control to establish two SIP Call legs; one SIP leg to the enterprise UE via the PBX, SIP-PSTN Gateway and the circuit-switched cellular network; the other SIP leg to the called party. As pointed out previously, these two call legs are joined together at the UCP node 104 in order to form a single end-to-end call between the enterprise user and the called party. The SIP INVITE requests sent contain the enterprise address of the enterprise UE terminal which can be in the form of SIP URI or as an E.164 number in a TEL URI along with the appropriate privacy setting if requested in the SIP REFER request. Alternatively, the privacy setting may be required by the enterprise network based on certain service provisioning policies and profiles. The enterprise address of the enterprise UE terminal can be transported in the SIP INVITE request using the SIP From header, Referred-By header, P-Asserted-Identity header, Identity header or Remote-Party-ID header. If a SIP URI is used as the enterprise address of the enterprise UE terminal, the SIP-PBX 110 may translate this address to the corresponding E.164 number that represents the enterprise address of the device. The SIP-PSTN GW 112 includes the E.164 number that represents the enterprise address of the enterprise UE terminal in the Calling Line Identity in the circuit-switched signaling messages.

Figure 3:
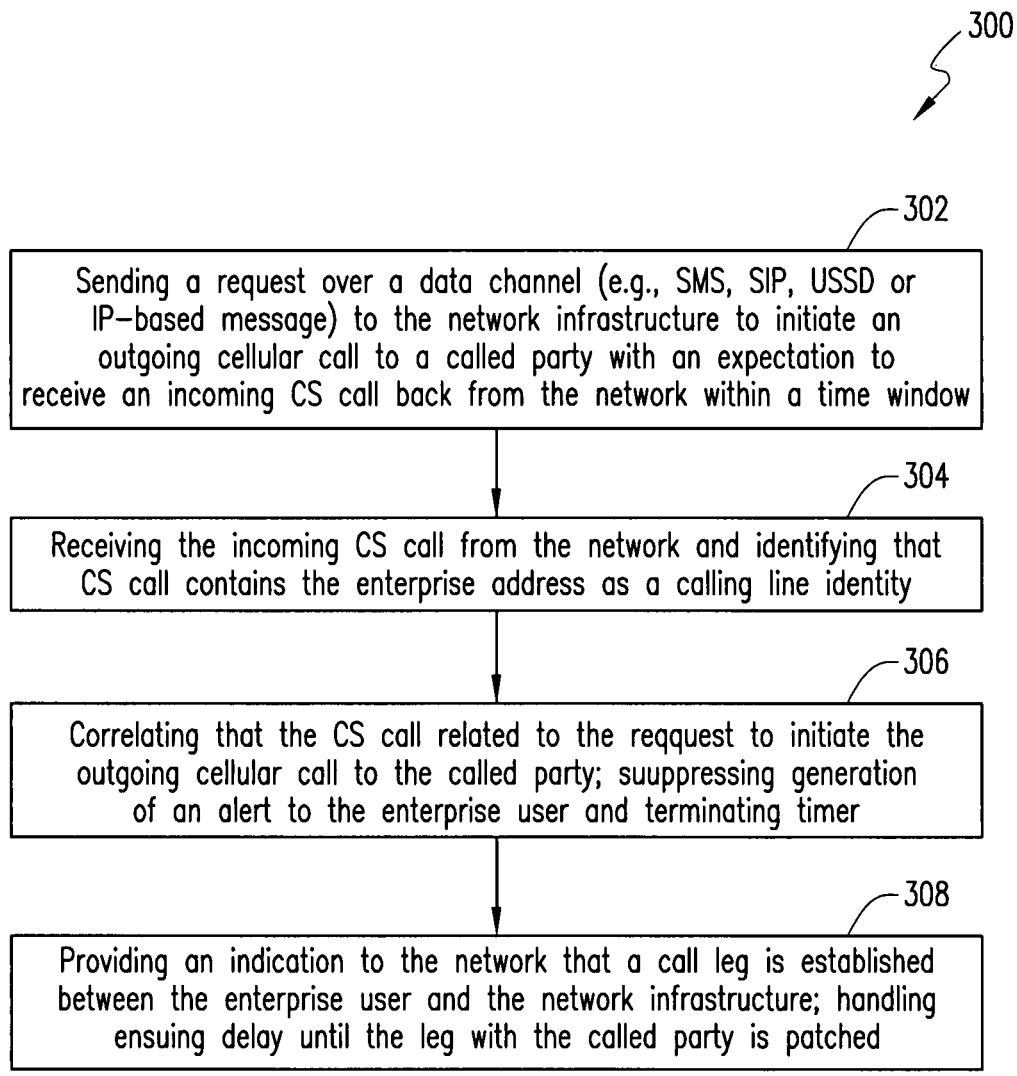
FIG. 3 depicts another flowchart of the present patent disclosure according to one embodiment.

With respect to the behavior of the enterprise UE for purposes of facilitating integration of an outgoing cellular call, reference may now be taken to FIG. 3 wherein a flowchart is depicted. When a request message for initiating an outgoing cellular call to a called party is transmitted to the network infrastructure, there is an expectation to receive an incoming circuit-switched call back from the network within a time window (block 302). Accordingly, a timer mechanism may be started at the application level to determine when to receive the circuit-switched call back in response to the outgoing request message. In one embodiment, if the timer expires, the enterprise UE device may try a number of times until a limit is reached, whereupon the call is considered to have failed. When the enterprise UE device receives a call establishment SETUP signaling request via the circuit-switched PSTN/PMLN signaling, the logic executing on the device is operable to identify that the circuit-switched call contains the enterprise address as the Calling Line Identity (block 304) (that is, the Calling Line Identity in the SETUP is the enterprise UE's enterprise address), and based thereon, the logic determines that this incoming call is related to the requested outgoing call (requested via the SIP REFER request or other message) (block 306). Accordingly, the logic operates to suppress generation of an alert to the enterprise user but establishes the circuit-switched call and stops the application timer (block 306). Further, the enterprise UE may provide an indication to the network that the call leg has been established (block 308). Accordingly, in one embodiment, the UCP node may wait until it receives such an acknowledgement of the establishment of the call leg with the enterprise UE device before attempting to establish the call leg to the called user by sending an SIP INVITE request in order to avoid the possibility of the called party answering before the call leg with the enterprise UE device is established (i.e., avoidance of a race condition). In the meantime, until the call legs are patched, there may be a delay experienced at the enterprise UE from the time the circuit-switched call leg with the network is established. Appropriate delay handling mechanisms(s) may therefore be provided to mitigate the delay.

When the called party's equipment receives the circuit-switched SETUP message (or SIP INVITE request if the called party is using a SIP phone within the enterprise SIP network or an external SIP network), the Calling Line Identity in the case of the circuit-switched SETUP message (or From header, Referred-By header, P-Asserted-Identity header, Identity header or Remote-Party-ID header in the case of SIP INVITE message) contains the enterprise address (e.g., E.164 number or SIP URI) of the enterprise UE device to be presented to the called party for Calling Line Identity Presentation (if provided based on the privacy setting). The called phone rings the user and returns an ALERTING message in the case of a circuit-switched call (or a SIP 180 "Ringing" response in the case of a SIP call). An ALERTING message will be translated by the SIP-PSTN gateway to a SIP 180 "Ringing" response. When the SIP 180 "Ringing" response is received at the UCP node, the service logic operable thereat may send a notification of "Ringing" back to the enterprise UE terminal via the cellular network's data network. In the case that the call establishment was triggered using a SIP REFER request, this notification may be in the form of a SIP NOTIFY request as specified in RFC 3515. In the case a message other than a SIP REFER request was used, the notification of "Ringing" may be sent using some other message. It is necessary to use the connection via the cellular network's data network to notify the "Ringing" since the call leg that is established with the enterprise UE terminal via the circuit-switched network is "in the wrong direction" to be able to indicate ALERTING using the circuit-switched signaling protocol.

Upon answering by the enterprise user, the UE terminal sends the circuit-switched CONNECT message (or SIP 200 "OK" response if the called party is using a SIP phone within the enterprise SIP network or an external SIP network). A CONNECT message will be translated by the SIP-PSTN GW to a SIP 200 "OK" response. When the SIP 200 "OK" response is received at the UCP node 104, it can send a notification of "OK" back to the enterprise UE terminal via the cellular network's data network. In the case that the call establishment was triggered using a SIP REFER request, this notification will be in the form of a SIP NOTIFY request as specified in RFC 3515. In the case a message other than a SIP REFER request was used, the notification of "OK" may be sent using some other message. At this point the call is established via the cellular network between the enterprise UE terminal and the called party, with the enterprise address of the enterprise UE terminal being displayed as the identity of the calling party.

Figure 4:
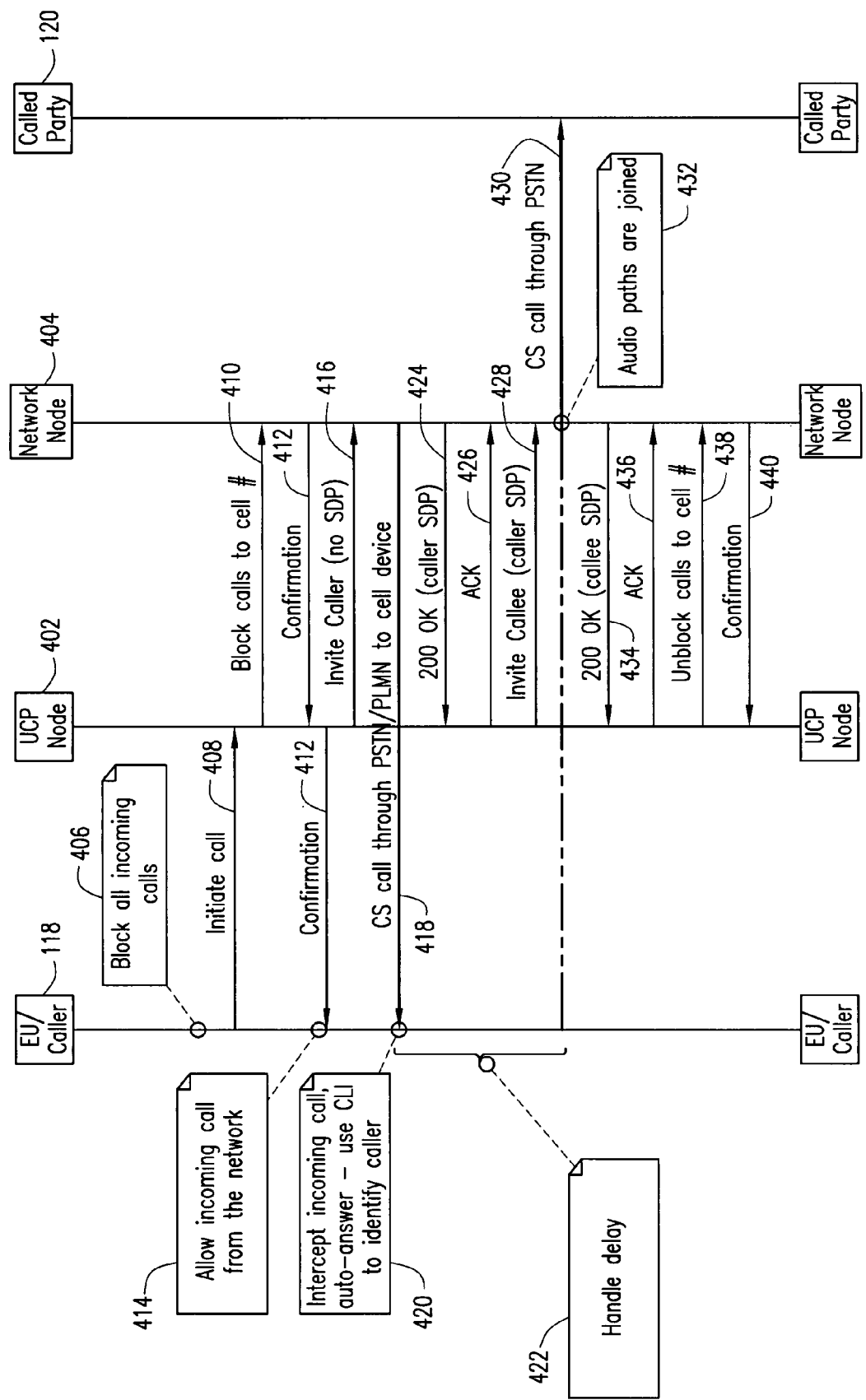
FIG. 4 depicts an exemplary message flow diagram according to one embodiment of the present patent disclosure.

FIG. 4 depicts an exemplary message flow diagram according to an embodiment of the process set forth above. As illustrated, a UCP node 402 and a network node 404 are exemplified to highlight the message flow between the enterprise UE 118 and the network infrastructure in particular detail. Upon blocking all incoming calls to the enterprise UE 108 (block 406), a request with respect to an outgoing call is initiated (reference numeral 408). In response, the UCP node 402 sends a message to the network node 404 (e.g., SIP-PBX) to block calls to the enterprise UE 118. A confirmation 412 is then propagated from the network node 404 to enterprise UE 118 via the UCP node 412, whereupon incoming calls from the network may be allowed (block 414). The UCP node 402 transmits a message 416 to the network node 404 to invite the enterprise user (i.e., caller) with respect to establishing a CS call 418 through the cellular network to the enterprise UE 118. Service logic at the enterprise UE 118 is operable to intercept the incoming CS call setup and identify that the enterprise address of the enterprise user is the CLI (block 420). Thereafter, a SIP 200 "OK" message 424 is generated by the network node 404 towards the UCP node 402 with respect to caller SDP. In response, an acknowledgement (ACK) 426 is generated by the UCP node 402. The UCP node 402 also generates a message 428 towards the network node 404 to invite the called party (i.e., callee) with respect to establishing a CS call 430 therewith through the PSTN/PLMN. As shown in block 422, appropriate service logic may be provided for handling the delay before patching the call legs. Pursuant to joining the audio paths (block 432), a SIP 200 "OK" message 434 is generated by the network node 404 towards the UCP node 402 with respect to callee SDP. In response, an acknowledgement (ACK) 436 is generated by the UCP node 402. A message 438 is provided thereafter by the UCP node 402 to the network node 404 in order to unblock calls to the enterprise UE 118, resulting in a confirmation 440 by the network node 404.

Figure 5:
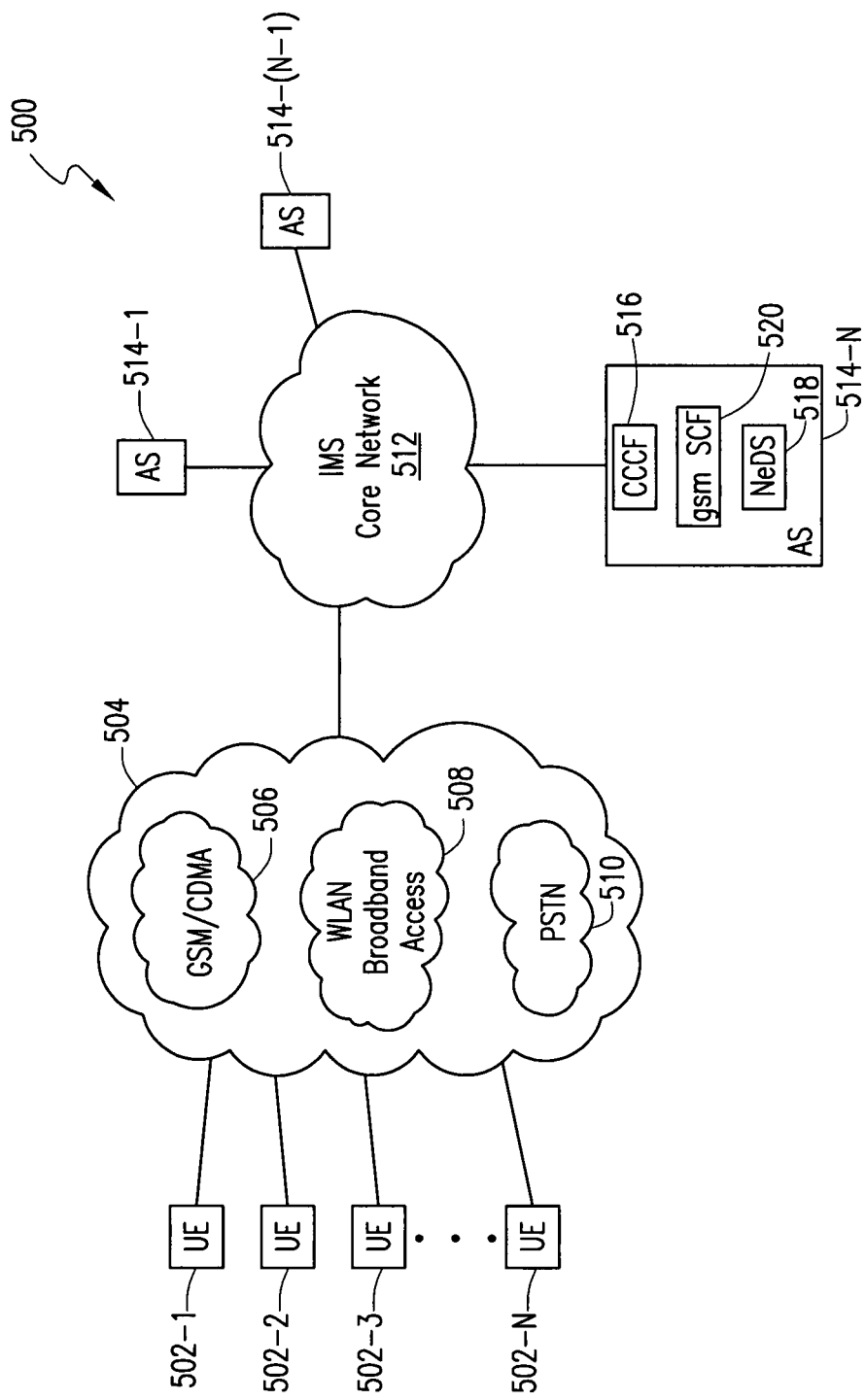
FIG. 5 depicts an exemplary IMS network environment wherein one or more embodiments of the present patent disclosure may be practiced for purposes of integrating an outgoing cellular call as an enterprise call.

An embodiment of the foregoing call integration mechanism may also be implemented within an IMS-based network environment in a different application wherein the functionality of the UCP node is provided as an IMS node. Referring now to FIG. 5, an exemplary IMS-based network environment 500 is depicted wherein an embodiment of the present patent disclosure may be practiced for effectuating call integration with respect to an enterprise call originated by a UE device. As depicted, the network environment 500 is generalized to include an access space 504 comprised of a number of access technologies available to one or more enterprise UE devices 502-1 through 502-N. As generalized previously, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Further, as alluded to hereinabove, the UE device may also capable of operating in multiple modes in that it can engage in both CS-based as well as PS-based communications, and can transition from one mode of communications to another mode of communications without loss of continuity.

The access space 504 may be comprised of both CS and PS networks, which may involve wireless technologies, wireline technologies, broadband access technologies, etc. For example, reference numeral 506 refers to wireless technologies such as GSM and CDMA networks, although it is envisaged that the teachings hereof may be extended to any $3^{rd}$ Generation Partnership Project (3GPP)-compliant cellular network (e.g., 3GPP or 3GPP2) as well. Reference numeral 508 refers to broadband access networks including WLANs, Wi-MAX networks as well as fixed networks such as DSL, cable broadband, etc. Thus, for purposes of the present disclosure, the access technologies may comprise RATs selected from IEEE 802.11a technology, IEEE 802.11b technology, IEEE 802.11g technology, IEEE 802.11n technology, GSM/EDGE Radio Access Network (GERAN) technology (both CS and PS domains), and UMTS technology, and Evolution-Data Optimized (EVDO) technology, and so on. Additionally, also exemplified as part of the access space 504 is the conventional wireline PSTN infrastructure 510 available to the enterprise UEs as illustrated in FIG. 5.

An IMS core network 512 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and SIP-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push-To-Talk (PTT), etc. IMS manages applications by defining common control components that each application server (AS) is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

Continuing to refer to FIG. 5, reference numerals 514-1 to 514-N refer to a plurality of AS nodes operable to support various services, e.g., VCC, PTT, etc., as alluded to hereinabove. Further, a call integration AS node having an IMS CS Control Function (ICCF, or CCF for short) may also be disposed within the core network for controlling call integration with respect to calls originated by one or more enterprise UE devices. Accordingly, it should be appreciated that at least one of the AS nodes is operable equivalent to the functionality of UCP node 104 described in detail hereinabove. Further, an AS node, e.g., AS 514-N, may be provided as part of the enterprise users' home IMS core network which implements functionality referred to as call continuity control function (CCCF) 516 and network domain selection (NeDS) 518. In essence, the CCCF portion 516 of AS 514-N is operable as a new IMS application server element that resides in the home IMS network and tracks all call sessions and related mobile VoIP bearer traffic, including call handover/routing between CS and IMS domains. The NeDS portion 518 of AS 114-N is responsible for performing, inter alia, registration/de-registration management between the IMS and CS networks (e.g., GSM or CDMA). Despite being potentially separate functions, it is possible to integrate both the CCCF and NeDS functionalities into a single IMS-compatible network element 514-N as illustrated in FIG. 5. Also, a suitable session control function (SCF) 520 may be provided as part of the AS node 514-N with respect to applicable radio access technology, e.g., gsmSCF. Additional related functional entities may include the following: Domain Transfer Function (DTF) (also referred to as Functional Entity FE-A), CS Adaptation Function (CSAF) (also referred to as FE-B), CAMEL Service (also referred to as FE-C), and Domain Selection Function (DSF) (also referred to as FE-D). Accordingly, for purposes of the present disclosure, the term "network node" with reference to an IMS core network may comprise one or more of the foregoing functionalities in any combination as applicable as well as the call integration functionality described herein.

Furthermore, although not shown in FIG. 5, a master user database, referred to as a Home Subscriber Server or HSS, may also be provided as part of the home IMS network 512, for supporting the various IMS network entities that actually manage calls or sessions such as UCP/AS node 514-N. In general, the HSS database may contain user profiles (i.e., subscription-related information), including various user and device identifies such as International Mobile Subscriber Identity (IMSI), Temporal Mobile Subscriber Identity (TMSI), International Mobile Equipment Identity (IMEI), Mobile Subscriber ISDN Number (MSISDN), Universally Unique Identifier (UUID), as well as additional IMS-specific identities such as IM Multimedia Private Identity (IMPI) and IP Multimedia Public Identity (IMPU) that are implemented as Tel-URIs or SIP-URIs.

Figure 6:
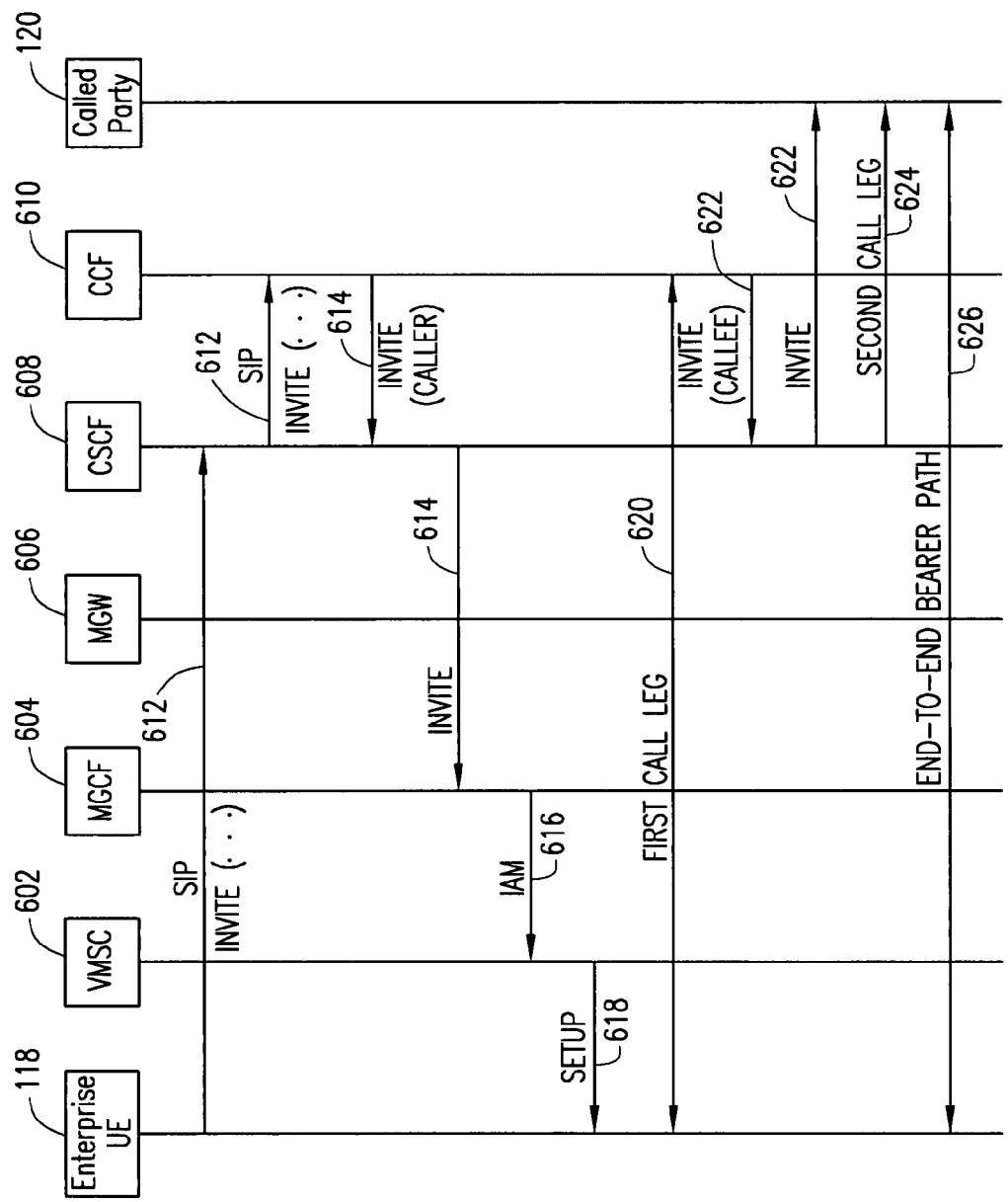
FIG. 6 depicts an exemplary message flow diagram according to another embodiment of the present patent disclosure.

FIG. 6 depicts an exemplary message flow diagram according to another embodiment of the present patent disclosure for call integration in an IMS-based environment such as the network environment 500 described in the foregoing sections. Network functionalities such as Visited Mobile Switching Center (VMSC) 602, Media Gateway Control Function (MGCF) 604, Media Gateway (MGW) 606 are operable with respect to IMS functionalities such as Call/Session Control Function (CSCF) 608 and CCF 610 for purposes of mediating an originating call by the enterprise UE 118 towards the call party 120. As illustrated, the enterprise UE 118 is operable to generate a SIP INVITE message 612 including the enterprise user information, called party information, as well as privacy setting information, as described hereinabove, towards CSCF node 608 which propagates SIP INVITE 612 to ICCF 610 embodying the call integration functionality. For purposes of establishing a first call leg, ICCF 610 generates a SIP INVITE message 614 towards the calling party, i.e., the enterprise UE 118, which is received by MGCF 604. In response, an Initial Address Message (IAM) 616 is generated towards VMSC 602, which in turn sends a SETUP message 618 to the enterprise UE 118. Thereafter, a first call leg is 610 is established between the enterprise UE 118 and the IMS network node. Further, ICCF 610 generates another SIP INVITE message 622 towards the called party 120, which is also mediated via CSCF 608. As a result, a second call leg 624 is established, which is patched with the first call leg 620 for establishing an end-to-end path 626 between the enterprise UE 118 and called party 120. Those skilled in the art will recognize that suitable timing mechanisms and delay handling mechanisms may also be implemented at the device side and/or the network side in order to avoid the race conditions and other operational issues set forth in detail with reference to the previously described embodiments.

Figure 7:
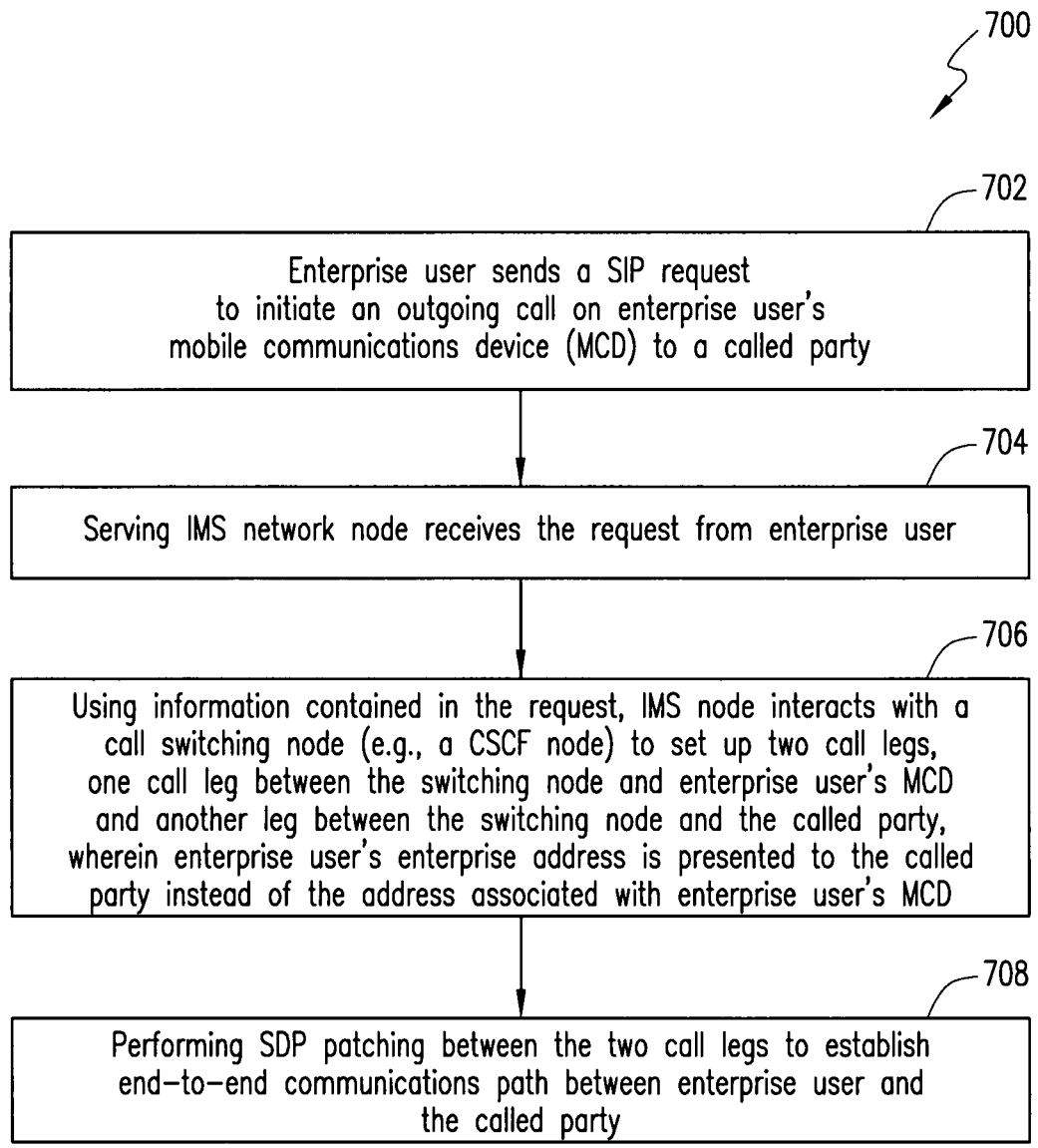
FIG. 7 depicts another flowchart of the present patent disclosure according to one embodiment.

FIG. 7 depicts another flowchart of the present patent disclosure according to one embodiment 700 which describes the IMS node functionality for effectuating call integration. As described above, an enterprise user sends a SIP INVITE request to initiate an outgoing call to a called party (block 702). A serving IMS network node receives the request from the enterprise user (block 704), whereupon it establishes two call legs in association with a CSCF node: one call leg between the IMS network and the enterprise user and another call leg between the IMS network and the called party. Using the information provided in the SIP INVITE message, the enterprise user's enterprise address is presented as a Calling Line Identity to the called party instead of the non-enterprise address of the enterprise user (block 706). The two call legs are then patched in order to establish the communication path between the parties (block 708). It should be appreciated that the various operations set forth herein may be accomplished via a number of means, including software (e.g., program code), firmware, hardware, or in any combination, usually in association with a processing system. Where the processes are embodied in software, such software may comprise program instructions that form a computer program product, uploadable service application software, or software downloadable from a remote station, and the like.

Figure 8:
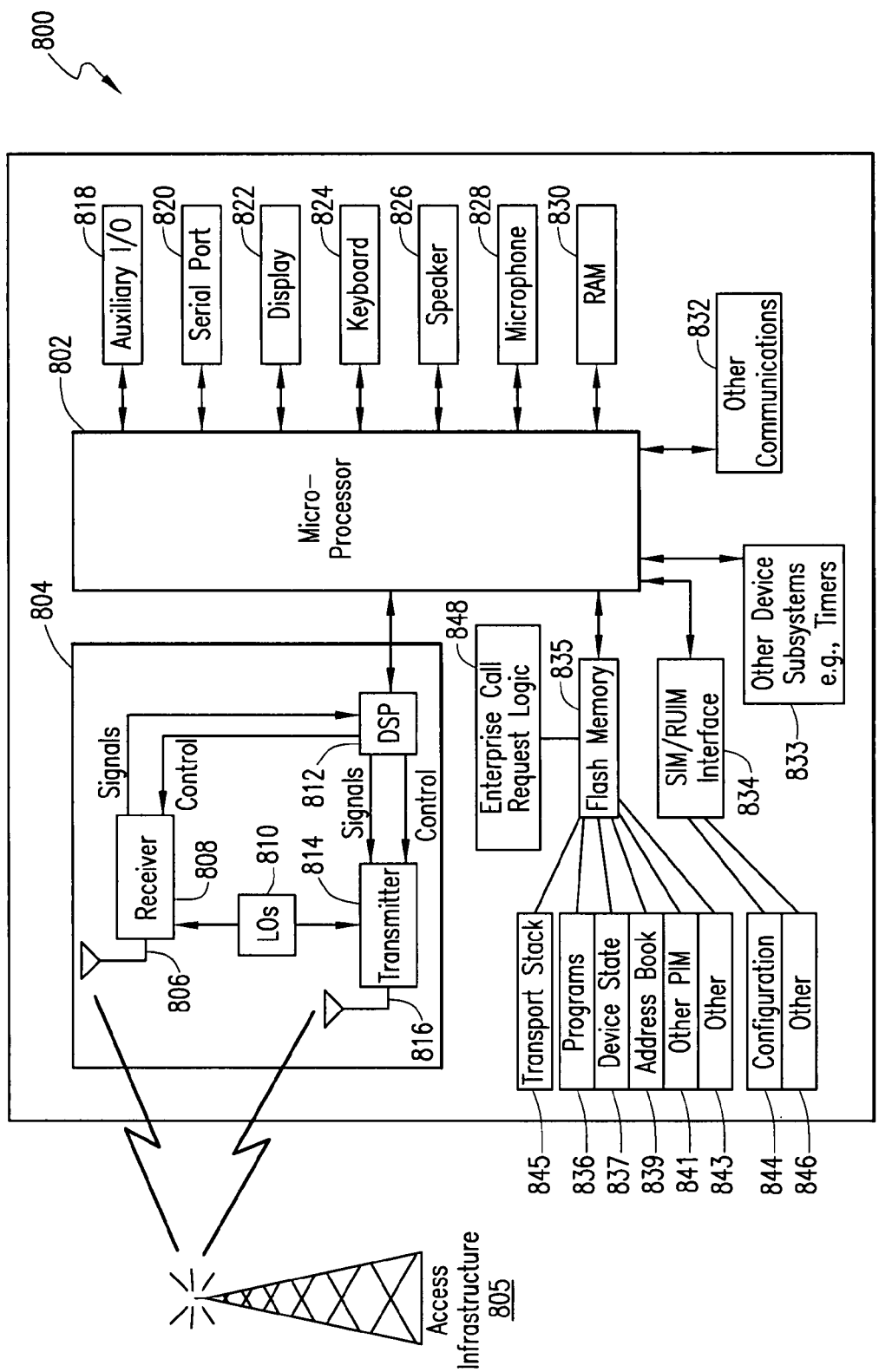
FIG. 8 depicts a block diagram of an embodiment of a communication device operable for purposes of the present patent disclosure.

FIG. 8 depicts a block diagram of an embodiment of a communications device 800 operable as a UE device, e.g., the enterprise UE 118, for purposes of the present patent disclosure. It will be recognized by those skilled in the art upon reference hereto that although an embodiment of UE 118 may comprise an arrangement similar to one shown in FIG. 8, there can be a number of variations and modifications, in hardware, software or firmware, with respect to the various modules depicted. Further, a UE device 800 for purposes of the present disclosure may comprise a mobile equipment (ME) device without a removable storage module and/or a mobile device coupled with such a storage module. Accordingly, the arrangement of FIG. 8 should be taken as illustrative rather than limiting with respect to the embodiments of the present patent disclosure. A microprocessor 802 providing for the overall control of an embodiment of UE 800 is operably coupled to a communication subsystem 804 that may preferably be capable of multi-mode communications (e.g., CS domain and PS domain). The communication subsystem 804 generally includes one or more receivers 808 and one or more transmitters 814 as well as associated components such as one or more local oscillator (LO) modules 810 and a processing module such as a digital signal processor (DSP) 812. As will be apparent to those skilled in the field of communications, the particular design of the communication module 804 may be dependent upon the communications networks with which the mobile device is intended to operate (e.g., a CDMA network, a GSM network, or a WLAN, et cetera). Regardless of the particular design, however, signals received by antenna 806 through appropriate access infrastructure 805 (e.g., cellular base station towers, WLAN hot spots, etc.) are provided to receiver 808, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 812, and provided to transmitter 814 for digital-to-analog (D/A) conversion, frequency up conversion, filtering, amplification and transmission over the air-radio interface via antenna 816.

Microprocessor 802 may also interface with further device subsystems such as auxiliary input/output (I/O) 818, serial port 820, display 822, keyboard/keypad 824, speaker 826, microphone 828, random access memory (RAM) 830, a short-range communications subsystem 832, and any other device subsystems, e.g., timer mechanisms, generally labeled as reference numeral 833. To control access, a USIM/RUIM interface 834 may also be provided in communication with the microprocessor 802. In one implementation, USIM/RUIM interface 834 is operable with a USIM/RUIM card having a number of key configurations 844 and other information 846 such as identification and subscriber-related data.

Operating system software and applicable service logic software may be embodied in a persistent storage module (i.e., non-volatile storage) such as Flash memory 835. In one implementation, Flash memory 835 may be segregated into different areas, e.g., storage area for computer programs 836 (e.g., service processing logic), as well as data storage regions such as device state 837, address book 839, other personal information manager (PIM) data 841, and other data storage areas generally labeled as reference numeral 843. A transport stack 845 may be provided to effectuate one or more appropriate radio-packet transport protocols. In addition, enterprise call request messaging logic 848, including memory storage for storing pertinent address information, is provided for facilitating integration of outgoing calls as set forth hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method for integrating an outgoing cellular call as an enterprise call, wherein said outgoing cellular call is originated by an enterprise user equipment that is attached to a cellular network towards a called party, said enterprise user having an enterprise address for an enterprise network and a non-enterprise address for said cellular network, comprising:

receiving, through a wireless connection to said enterprise network, a Session Initiation Protocol (SIP) INVITE request from said enterprise user equipment for initiating said outgoing cellular call to said called party, wherein said enterprise user equipment is attached to said cellular network separate from said enterprise address;

establishing a first call leg between a SIP-capable Private Branch Exchange (PBX) in said enterprise network and said enterprise user equipment via said cellular network;

establishing a second call leg between said SIP-capable PBX and said called party via said cellular network, wherein said called party is attached to said cellular network; and patching said first and second call legs to establish an end-to-end communications path between said enterprise user equipment and said called party, wherein said enterprise address is presented instead of said non-enterprise address to said called party as a calling line identity with respect to said outgoing cellular call from said enterprise user equipment, and the first leg is associated with a first user and a portion is circuit switched based and the second leg is associated with a second user and a portion is packet based.

2. The method as recited in claim 1, wherein said SIP INVITE request includes said enterprise address, said non-enterprise address, said called party's address, and a privacy indication.

3. The method as recited in claim 2, wherein said enterprise address comprises one of a SIP Uniform Resource Identifier (URI) and an E-164 number.

4. The method as recited in claim 2, wherein said non-enterprise address comprises a cellular telephony network number in E-164 format.

5. The method as recited in claim 2, wherein said called party's address comprises one of a SIP Uniform Resource Identifier (URI) and an E-164 number.

6. The method as recited in claim 1, wherein said first call leg is established by sending a SIP INVITE message towards said enterprise user equipment.

7. The method as recited in claim 1, wherein said second call leg is established by sending a SIP INVITE message towards said called party.

8. An IP Multimedia Subsystem (IMS) network node for integrating an outgoing cellular call that is established by a User Equipment (UE) device attached to a cellular network as an enterprise call, wherein said outgoing cellular call is originated by an enterprise user equipment towards a called party, said enterprise user equipment having an enterprise address for an enterprise network and a non-enterprise address for said cellular network, comprising:
 a processor;
 instructions, operable to be executed by said processor, for receiving, through a wireless connection to said enterprise network, a Session Initiation Protocol (SIP) INVITE request from said enterprise user equipment for initiating said outgoing cellular call to said called party, wherein said enterprise user equipment is attached to said cellular network separate from said enterprise address;
 instructions, operable to be executed by said processor, for establishing a first call leg between a SIP-capable Private Branch Exchange (PBX) in said enterprise network and said enterprise user equipment via said cellular network;
 instructions, operable to be executed by said processor, for establishing a second call leg between said SIP-capable PBX and said called party via a packet-based network; and
 instructions, operable to be executed by said processor, for patching said first and second call legs to establish an end-to-end communications path between said enterprise user equipment and said called party, wherein said enterprise address is presented instead of said non-enterprise address to said called party as a calling line identity with respect to said outgoing cellular call from said enterprise user, and the first leg is associated with a first user and a portion is circuit switched based and the second leg is associated with a second user and a portion is packet based, said instructions being stored on a tangible computer-readable media in said IMS network node.

9. The IMS network node as recited in claim 8, wherein said SIP INVITE request includes said enterprise address, said non-enterprise address, said called party's address, and a privacy indication.

10. The IMS network node as recited in claim 9, wherein said enterprise address comprises one of a SIP Uniform Resource Identifier (URI) and an E-164 number.

11. The IMS network node as recited in claim 9, wherein said called party's address comprises one of a SIP Uniform Resource Identifier (URI) and an E-164 number.

12. The IMS network node as recited in claim 9, wherein said non-enterprise address comprises a cellular telephony network number in E-164 format.

13. The IMS network node as recited in claim 8, wherein said first call leg is established by sending a SIP INVITE message towards said enterprise user equipment.

14. The IMS network node as recited in claim 8, wherein said second call leg is established by sending a SIP INVITE message towards said called party.

15. An IP Multimedia Subsystem (IMS)-capable user equipment (UE) device, comprising:
 a processor;
 instructions, operable to be executed by said processor, for transmitting, through a wireless connection to an enterprise network, a Session Initiation Protocol (SIP) INVITE request with respect to initiating an outgoing cellular call to a called party while said UE device is attached to a cellular network, said SIP INVITE request including an enterprise address for said enterprise network and a non-enterprise address for said cellular network, each associated with a user of said UE device and said SIP INVITE further being directed to an IMS network node, wherein said user equipment is attached to said cellular network separate from said address; and
 instructions, operable to be executed by said processor, for establishing a first call leg with said IMS network node through said cellular network responsive to receiving a SETUP message via a circuit-switched network in response to a SIP INVITE message back from said IMS network node, and the first leg is associated with the user and includes a portion that is circuit switched based and a second leg of the outgoing cellular call is associated with the called party and includes a portion that is packet based, wherein said enterprise address is presented instead of said non-enterprise address to said called party as a calling line identity with respect to said outgoing cellular call from said user, and said instructions being stored on a tangible computer-readable media in said UE device.

16. The IMS-capable UE device as recited in claim 15, further comprising instructions, operable to be executed by said processor, for providing an indication to said IMS network node that said first call leg is established between said UE device and said network node.

17. The IMS-capable UE device as recited in claim 15, further comprising instructions, operable to be executed by said processor, for disabling incoming calls to said UE device, wherein the disabling is operable upon sending said SIP INVITE request.

18. The IMS-capable UE device as recited in claim 15, wherein said request further includes said called party's address, and a privacy indication.

19. The IMS-capable UE device as recited in claim 18, wherein said enterprise address comprises one of a SIP Uniform Resource Identifier (URI) and an E-164 number.

20. The IMS-capable UE device as recited in claim 18, wherein said called party's address comprises one of a SIP Uniform Resource Identifier (URI) and an E-164 number.

21. The IMS-capable UE device as recited in claim 18, wherein said non-enterprise address comprises a cellular telephony network number in E-164 format.

22. The IMS-capable UE device as recited in claim 15, further comprising instructions, operable to be executed by said processor, for sending said SIP INVITE request towards said IMS network node a select number of times.

* * * * *

UNITED STATES PATENT AND TRADEMARK OFFICE
CERTIFICATE OF CORRECTION

| | | |
|---|---|---|
| PATENT NO. | : 9,706,045 B2 | Page 1 of 1 |
| APPLICATION NO. | : 11/796827 | |
| DATED | : July 11, 2017 | |
| INVENTOR(S) | : Andrew Michael Allen et al. | |

It is certified that error appears in the above-identified patent and that said Letters Patent is hereby corrected as shown below:

In the Specification

In Column 1, Line 18, Delete "CALL"," and insert -- CALL" --, therefor.

In the Claims

In Column 14, Line 39, In Claim 15, Delete "said address;" and insert -- said enterprise address; --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*